(12) United States Patent
Akagiri et al.

(10) Patent No.: US 6,445,875 B1
(45) Date of Patent: Sep. 3, 2002

(54) APPARATUS AND METHOD FOR DETECTING EDITION POINT OF AUDIO/VIDEO DATA STREAM

(75) Inventors: Kenzo Akagiri; Yoshinari Chida, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/111,341

(22) Filed: Jul. 7, 1998

(30) Foreign Application Priority Data

Jul. 9, 1997 (JP) .............................................. 9-183535

(51) Int. Cl.<sup>7</sup> .............................................. G11B 27/00
(52) U.S. Cl. ............................ 386/52; 386/64; 348/700
(58) Field of Search ............................ 386/1, 4, 39, 33, 386/45, 46, 52, 64, 69, 111, 112, 96; 348/907, 700, 701, 382; 375/240.05, 240.07, 240.14, 377

(56) References Cited

U.S. PATENT DOCUMENTS

| | | | | |
|---|---|---|---|---|
| 4,390,904 A | * | 6/1983 | Johnston et al. | 386/53 |
| 5,642,174 A | * | 6/1997 | Kazui et al. | 348/700 |
| 5,692,093 A | * | 11/1997 | Iggulden et al. | 386/46 |
| 5,872,598 A | * | 2/1999 | Legall et al. | 348/405 |
| 5,999,688 A | * | 12/1999 | Iggulden et al. | 386/46 |
| 6,057,893 A | * | 5/2000 | Kojima et al. | 348/700 |
| 6,094,234 A | * | 7/2000 | Nonomura et al. | 348/700 |
| 6,137,544 A | * | 10/2000 | Dimitrova et al. | 348/700 |
| 6,154,218 A | * | 11/2000 | Murase et al. | 345/433 |
| 6,157,744 A | * | 12/2000 | Nagasaka et al. | 382/236 |
| 6,160,950 A | * | 12/2000 | Shimazaki et al. | 386/46 |

* cited by examiner

*Primary Examiner*—Andrew Faile
*Assistant Examiner*—Polin Chieu
(74) *Attorney, Agent, or Firm*—Frommer Lawrence & Haug LLP; William S. Frommer; Glenn R. Savit

(57) ABSTRACT

Information searching apparatus and method and a transmission medium with which an edition point can be detected simply from coded data without decoding all the coded data. Particularly, in the present invention, an audio signal is divided into plural blocks on the frequency axis every predetermined time (every predetermined frame), and a scale factor serving as a floating coefficient and a word length are coded as a parameter. In a recording medium are recorded coded audio data and the parameters together with the number Ni of the parameters. In a high-speed searching operation, the parameter number Ni is extracted, and a frame for which the parameter Ni varies stepwise is detected as the edition point.

18 Claims, 11 Drawing Sheets

| | | | | | | EDITION<br>POINT<br> | | $T_1=5$<br>$T_2=4$ | | | | | | | |
|---|---|---|---|---|---|---|---|---|---|---|---|---|---|---|---|
| FRAME i | 1 | 2 | 3 | 4 | 5 | 6 | 7 | 8 | 9 | 10 | 11 | 12 | 13 | 14 | 15 | 16 |
| PARAMETER NUMBER Ni | 9 | 9 | 9 | 9 | 9 | 9 | 9 | 10 | 10 | 10 | 10 | 10 | 10 | 10 | 10 | 10 |
| SUM OF PRODUCTS Si | | | | | | 0 | 0 | 5 | 4 | 3 | 2 | 1 | 0 | 0 | 0 | 0 |

FIG.6

EDITION POINT (at frame 8)  
$T_1 = 5$  
$T_2 = 4$

| FRAME i | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| PARAMETER NUMBER $N_i$ | 9 | 9 | 9 | 9 | 9 | 9 | 9 | 10 | 10 | 10 | 10 | 10 | 10 | 10 | 10 | 10 |
| SUM OF PRODUCTS $S_i$ |  |  |  |  |  | 0 | 0 | 5 | 4 | 3 | 2 | 1 | 0 | 0 | 0 | 0 |

FIG.7

| FRAME i | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PARAMETER NUMBER $N_i$ | 9 | 9 | 9 | 9 | 9 | 9 | 9 | 10 | 9 | 9 | 9 | 9 | 9 | 9 | 9 |
| SUM OF PRODUCTS $S_i$ |  |  |  |  |  | 0 | 0 | 5 | 1 | 1 | 1 | 1 | 1 | 1 | 0 |

FIG.9

EDITION POINT ↓ (at frame 5)

| FRAME i | 1 | 2 | 3 | 4 | 5 | 6 | 7 | 8 |
|---|---|---|---|---|---|---|---|---|
| PARAMETER NUMBER $N_i$ | 9 | 9 | 9 | 9 | 10 | 10 | 10 | 10 |
| DIFFERENCE $N_i - N_{i-1}$ OF STEP S55 |  | 0 | 0 | 0 | 1 |  | 0 | 0 |
| DIFFERENCE $N_i - N_{i-1}$ OF STEP S59 |  |  |  |  |  | 0 |  |  |

FIG.10

| FRAME i | 1 | 2 | 3 | 4 | 5 | 6 | 7 | 8 |
|---|---|---|---|---|---|---|---|---|
| PARAMETER NUMBER $N_i$ | 9 | 9 | 9 | 9 | 10 | 9 | 9 | 9 |
| DIFFERENCE $N_i - N_{i-1}$ OF STEP S55 |  | 0 | 0 | 0 | 1 |  | 0 | 0 |
| DIFFERENCE $N_i - N_{i-1}$ OF STEP S59 |  |  |  |  |  | -1 |  |  |

FIG.13

| WL | 4 | 4 | 3 | 4 | 3 | 0 | 2 | 3 | 2 | 0 | 0 | 0 |

SF

MAIN INFORMATION

FIG.14

| picture_coding_extension(){ | NO. of bits | Mnemonic |
|---|---|---|
| extension_start_code | 32 | bslbf |
| extension_start_code_identifier | 4 | uimsbf |
| f_code[0][0] /*forward horizontal*/ | 4 | uimsbf |
| f_code[0][1] /*forward vertical*/ | 4 | uimsbf |
| f_code[1][0] /*backward horizontal*/ | 4 | uimsbf |
| f_code[1][1] /*backward vertical*/ | 4 | uimsbf |
| intra_dc_precision | 2 | uimsbf |
| picture_structure | 2 | uimsbf |
| top_field_first | 1 | uimsbf |
| frame_pred_frame_dct | 1 | uimsbf |
| concealment_motion_vectors | 1 | uimsbf |
| q_scale_type | 1 | uimsbf |
| intra_vlc_format | 1 | uimsbf |
| altemate_scan | 1 | uimsbf |
| repeat_first_field | 1 | uimsbf |
| chroma_420_type | 1 | uimsbf |
| progressive_frame | 1 | uimsbf |
| composite_display_flag | 1 | uimsbf |
| if(composite_display_flag){ | | |
|     v_axis | 1 | uimsbf |
|     field_sequence | 3 | uimsbf |
|     sub_carrier | 1 | uimsbf |
|     burst_amplitude | 7 | uimsbf |
|     sub_carrier_phase | 8 | uimsbf |
| } | | |
| next_start_code() | | |
| } | | |

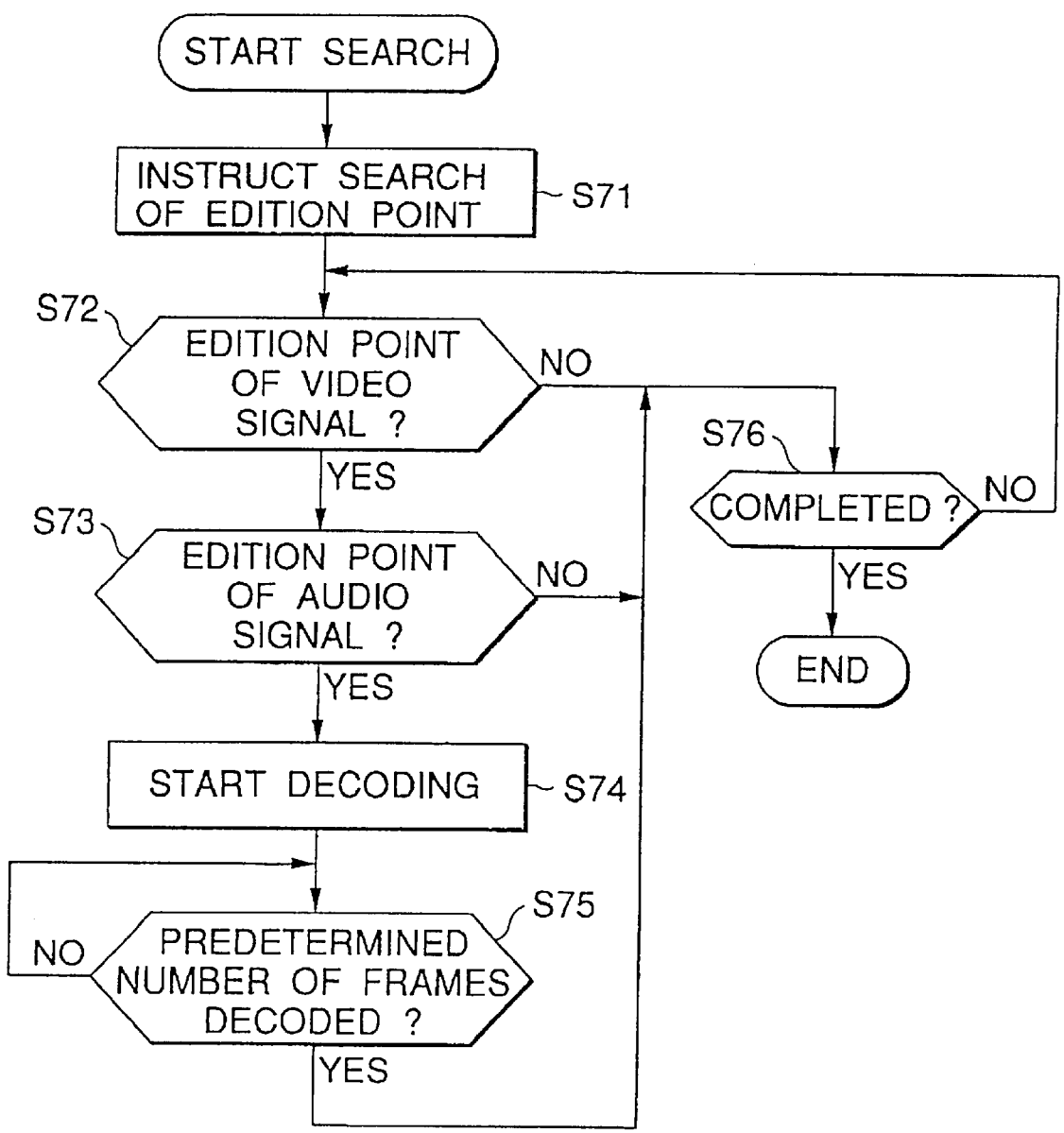

APPARATUS AND METHOD FOR DETECTING EDITION POINT OF AUDIO/VIDEO DATA STREAM

BACKGROUND OF THE INVENTION

1. Field of the Invention

The present invention relates to information searching apparatus and method, and a transmission medium, and more particularly to information searching apparatus and method and a transmission medium with which an edition point can be detected by an apparatus having a simple structure and a low price.

2. Description of the Related Art

ATRAC (Adaptive transform Acoustic Coding) (Trademark) used for MD (mini disc) (Trademark) is known as a technique for performing high-efficiency coding by using redundancy of digital audio signals. According to ATRAC, a digital audio signal is blocked every predetermined time length to code spectrum data by utilizing redundancy thereof. Thereafter, the spectrum data are recorded in a magneto-optical disc (MD) together with parameters representing coding conditions.

In order to record a long-time digital video signal into a compact-size recording medium having a small recording capacity, it is indispensable to code the video signal with high efficiency. In order to satisfy such a requirement, various high-efficiency coding systems using correlation of video signals have been proposed, and the MPEG (Moving Picture Experts Group) system is known as one of these high-efficiency coding systems. The MPEG system is a hybrid system in which a motion compensation prediction coding system and a discrete cosine transform (DCT) coding system are used in combination with each other. According to the MPEG system, a frame is divided into blocks (called as "macro-blocks") for processing. In the processing, redundancy on time axis is cut out by taking a difference between frames, and then redundancy on spatial axis is cut out by using discrete cosine transform, thereby coding video signals efficiently.

In general, the coded signals which are formed by these high-efficiency coding systems are not quantitative, but the information amount thereof varies with time lapse. Therefore, it is known that higher image quality can be obtained by using a variable bit rate coding than by using a fixed bit rate coding for the same coding amount.

When a specific position (for example, represented by a scene change position (this position is hereinafter referred to as "edition point")) is searched from reproduced signals based on the coded signals coded by the above high-efficiency coding methods, the coded signals are decoded at a higher speed than at a normal speed for reproduction and display. A user searches an edition point from images which are continuously reproduced and displayed at a high speed while viewing these images.

Therefore, for search of an edition point, the performance of a normal decoding and reproducing apparatus is insufficient, and the performance of a higher-speed decoding and reproducing apparatus is required. For example, when an edition point is searched while feeding a recording medium at a speed which is five times as high as the normal decoding and reproducing apparatus, a decoding processor is required to perform decoding processing at a speed which is five times as high as the normal processing speed. Further, in order to support variation of a sampling rate, etc., higher-speed processing is required. A processor which can perform such high-speed processing can be implemented by a parallel processor architecture or the like, however, it is very high in price and more complicated in construction. In an editing apparatus for business, such a high-price process can be used, however, it is difficult to use such a high-price processor in a domestic reproducing apparatus.

Further, there is a case where highly efficiently coded signals are processed in a personal computer (hereinafter merely referred to as "PC"). A general purpose processor is used in such a PC, and a decoding method is supplied in the form of a program, so that it is more difficult to perform decoding processing at a higher speed by using a general-purpose processor than by using a special-purpose processor.

OBJECT AND SUMMARY OF THE INVENTION

The present invention has been implemented in view of such a situation, and has an object to provide information searching apparatus and method, and a transmission medium in which an edition point can be searched with a low-price apparatus having a simple construction.

In order to attain the above object, an information searching apparatus according to the present invention is characterized by comprising extraction means for extracting a parameter associated with coding from data which are obtained by coding predetermined information every predetermined unit, comparison means for comparing a parameter of a predetermined unit with a parameter of another unit, and detection means for detecting an edition point of information in accordance with a comparison result of the comparing means.

An information searching method according to the present invention is characterized by comprising an extraction step for extracting a parameter associated with coding from data which are obtained by coding predetermined information every predetermined unit, a comparison step for comparing a parameter of a predetermined unit with a parameter of another unit, and a detection step for detecting an edition point of information in accordance with a comparison result of the comparing step.

A transmission medium according to the present invention is characterized by transmitting a program comprising an extraction step for extracting a parameter associated with coding from data which are obtained by coding predetermined information every predetermined unit, a comparison step for comparing a parameter of a predetermined unit with a parameter of another unit, and a detection step for detecting an edition point of information in accordance with a comparison result of the comparing step.

BRIEF DESCRIPTION OF THE DRAWINGS

FIG. 6 is a diagram showing variation of the number of parameters every frame;

FIG. 7 is a diagram showing variation of the number of parameters every frame;

FIG. 9 is a diagram showing variation of the number of parameters every frame;

FIG. 10 is a diagram showing variation of the number of parameters every frame;

FIG. 13 is a diagram showing a recording state of audio data;

FIG. 14 is a diagram showing parameters of video data; and

FIG. 15 is a flowchart showing another search processing of the embodiment of FIG. 1.

DETAILED DESCRIPTION OF THE PREFERRED EMBODIMENTS

A preferred embodiment according to the present invention will be described hereunder with reference to the accompanying drawings.

A preferred embodiment of an information searching apparatus according to the present invention will be described on the basis of a case where an edition point is searched from coded signals obtained by coding audio signals with high efficiency or coded signals based on MPEG video.

Figure 1:
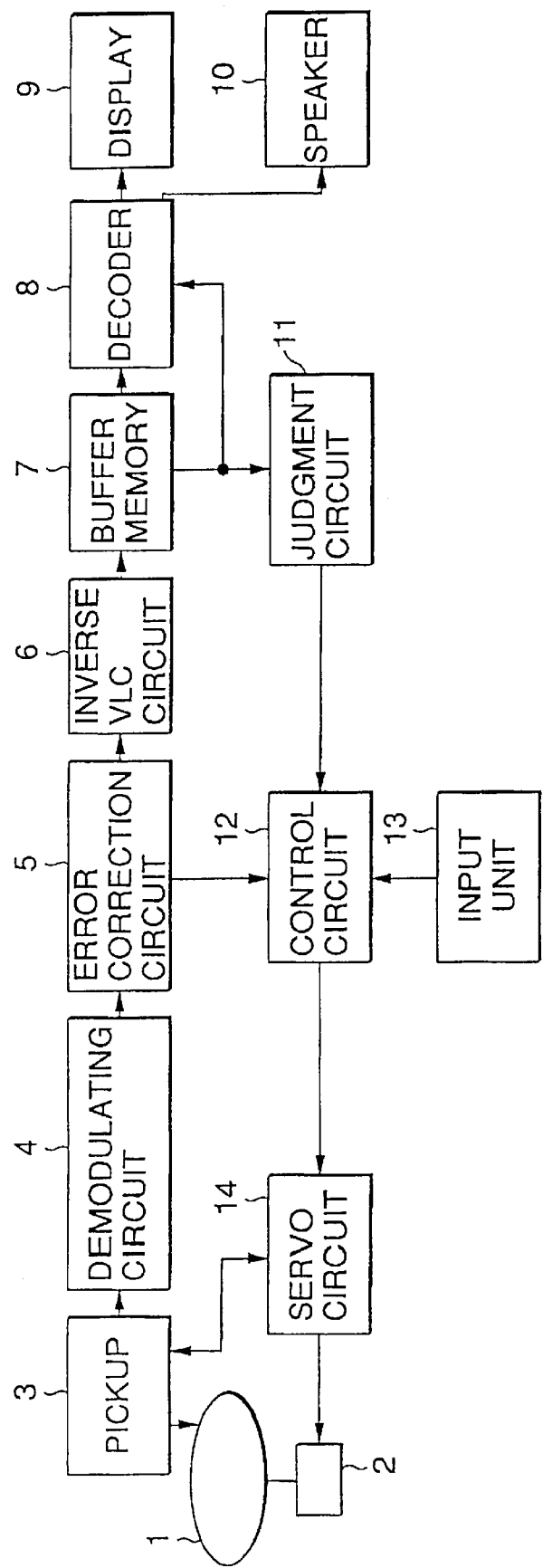
FIG. 1 is a block diagram showing the construction of an information searching apparatus according to the present invention.

FIG. 1 is a block diagram showing the construction of the information searching apparatus of the present invention.

Video data which are encoded according to the MPEG system and audio data which are compressed according to the ATRAC system are recorded in a disc 1 which is rotated at a predetermined speed by a spindle motor 2. A pickup 3 irradiates a laser beam to the disc 1 to reproduce signals recorded in the disc 1. A demodulation circuit 4 demodulates a reproduction signal output from the pickup 3 and outputs the demodulated signal to an error correction circuit 5. The error correction circuit 5 corrects the error of the demodulated signal, and outputs the corrected signal to an inverse VLC (Variable Length Code) circuit 6. The inverse VLC circuit 6 converts the code of the input VLC (variable length code) to a predetermined-length code and outputs it to a buffer memory.

In this embodiment, the disc 1 is designed so that information can be reproduced from the disc 1 at a speed which is several times as high as a normal reproducing speed, and data whose amount is larger than the data amount required in the normal reproducing operation (video data of several frames in the case of video data, audio data of several seconds in the case of audio data) can be recorded in the buffer memory 7.

The main data (video data and audio data) read out from the buffer memory 7 are supplied to a decoder 8. In the decoder 8, the video data are decoded according to the MPEG system and then the decoding result is output to a display 9 while the audio data are decoded (expanded) according to the ATRAC system and then output to a speaker 10. Further, parameters read out from the buffer memory 7 are supplied to the decoder 8, and also supplied to the judgment circuit 11. The judgment circuit 11 detects variation of the parameters, and judges on the basis of the detection result whether it is an edition point.

For example, the judgment result of the judgment circuit 11 is input to a control circuit 12 which is constructed by a microcomputer or the like, and also the correction result of the error correction circuit 5 is input to the control circuit 12. Further, an instruction corresponding to the operation of a user is input from an input unit 13 to the control circuit 12.

A servo circuit 14 is controlled by the control circuit 12 so as to rotate the spindle motor 2 at a predetermined speed, and controls various servo operations such as focus servo, tracking servo, radial servo, etc. for the pickup 3.

Figure 2:
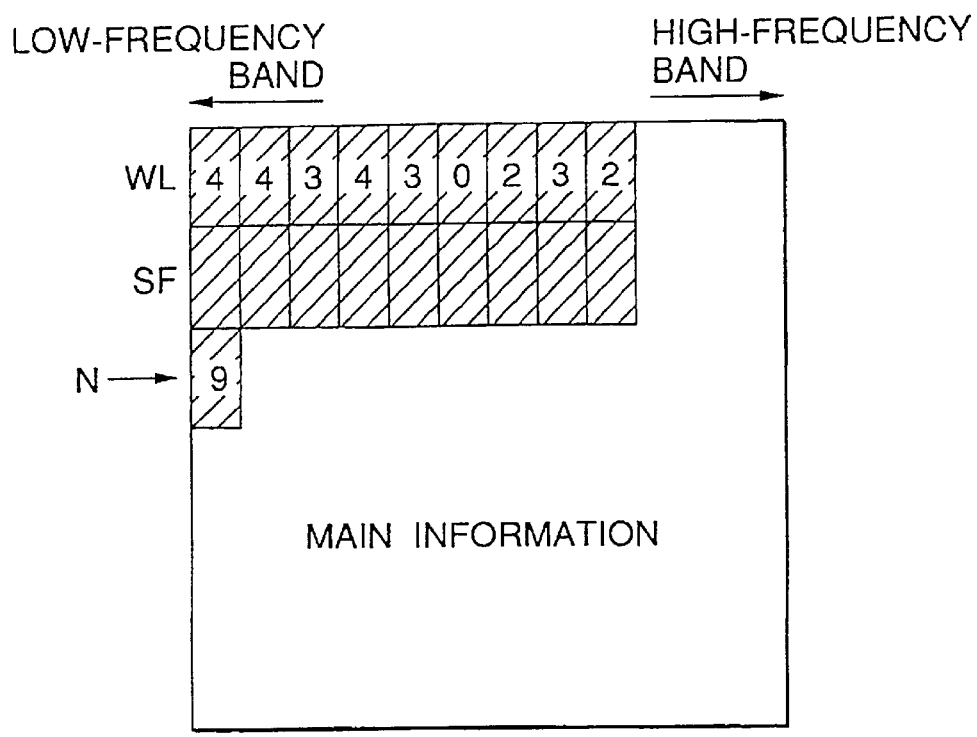
FIG. 2 is a diagram showing audio data recorded in a disc of FIG. 1.
Figure 3:
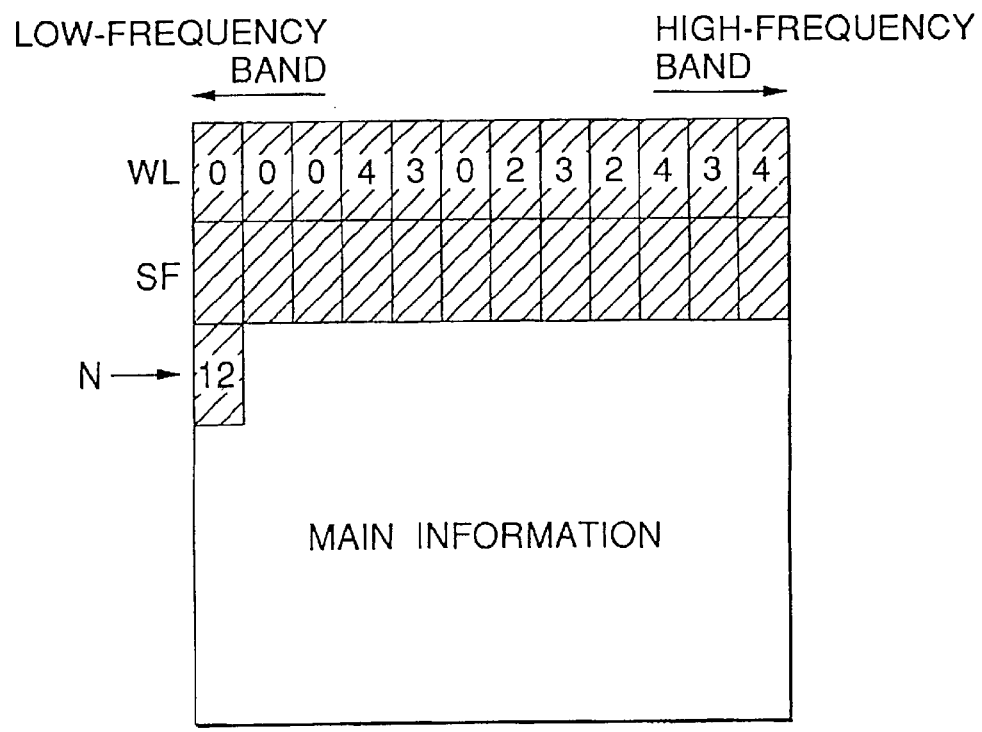
FIG. 3 is a diagram showing audio data recorded in the disc of FIG. 1.

FIGS. 2 and 3 schematically show the data of one frame of audio data recorded in the disc 1. In this embodiment, the audio data are recorded in the disc 1 while compressed according to a method as disclosed in Japanese Unexamined Patent Application No. Hei-5-91062, for example. That is, an audio signal is divided into plural blocks on the frequency axis every predetermined time (every predetermined time frame), and so-called block floating processing is carried out every block. The data of each block are adaptively subjected to bit allocation to be quantized.

The block floating processing is basically the processing of increasing the value common to respective words in a block by multiplication to enhance precision in quantization processing. Specifically, for example, the largest value (the maximum absolute value) of the absolute values of the respective words in a block is searched and all the words in the block are multiplied by a common floating coefficient so that the maximum absolute value is not saturated.

As parameters BF associated with the block floating processing are provided a scale factor SF as a floating coefficient, and a word length WL representing the difference from a permissible noise level which is bundled every block in consideration of the scale factor SF and a so-called masking effect.

In this embodiment, as shown in FIGS. 2 and 3, the word lengths WL and the scale factors SF are recorded while the number thereof is varied every frame. For example, in a frame shown in FIG. 2, word lengths WL and scale factors SF on nine frequency bands from the lower frequency band are recorded. In addition, the number N of parameters BF (in the case of FIG. 2, N=9) is also recorded.

On the other hand, in a frame shown in FIG. 3, parameters of all frequency bands (totally eleven frequency bands) from the lower frequency band to the high frequency band are recorded. Accordingly, "12" is recorded as the number N of the parameters BF.

Next, the search processing of the information searching apparatus shown in FIG. 1 will be described with reference to a flowchart of FIG. 4.

When the input unit 13 is operated to instruct search, the control circuit 12 controls the servo circuit 14 so that the spindle motor 2 rotates the disc 1 at a speed which is five times as high as the normal reproducing speed. The control circuit 12 outputs an edition point searching instruction to each unit in step S1.

The pickup 3 is moved to a predetermined search start position by the servo circuit 14 to start the reproduction from that position. The demodulation circuit 4 demodulates the reproduction signal output from the pickup 3 and outputs the demodulated signal to the error correction circuit 5. The error correction circuit 5 performs error correction on the input demodulated signal, and then, outputs the error-corrected signal to the inverse VLC circuit 6. The inverse VLC circuit 6 converts the input variable-length code to a fixed-length code and supplies it to the buffer memory 7 to memorize the code.

The parameters of each frame in the audio data stored in the buffer memory 7 are read out from the buffer memory 7, and supplied to the judgment circuit 11. At this time, the judgment circuit 11 executes the edition point search processing shown in th e flowchart of FIG. 5.

First, the judgment circuit 11 initially sets a variable i to "1" in step S21, and then obtains a parameter Ni and temporarily stores it into a built-in memory in step S22. Subsequently, the processing goes to step S23 to increment the variable i by "1", and in step S24 it is judged whether the variable i is equal to a predetermined value n. If the variable i is not equal to the predetermined value n, the processing returns to step S22 in which the judgment circuit 11 obtains a next parameter Ni and stores it. In next step S23, the variable i is incremented by "1".

The above processing is repetitively carried out until it is judged in step S24 that the variable i is equal to the value n. For example, when the value n is equal to 5, the above processing is carried out until parameters $N_1$ to $N_5$ of five blocks are stored.

If it is judged in step S24 that the variable i is equal to the predetermined value n, the processing goes to step S25 to increment the variable i by "1" (at present, i=6), and the processing goes to step S26. In step S26, a new parameter Ni is obtained again, and stored in the judgment circuit 11. Subsequently, the processing goes to step S27, and the judgment circuit 11 calculates Si from the following equation:

$$S_i = \sum_{k=1}^{n} |N_i - N_{i-k}|$$

That is, the judgment circuit 11 calculates the absolute value of the difference ($N_6$–$N_5$) between the number $N_6$ of parameters of a sixth block and the number $N_5$ of parameters of a fifth block just before the sixth block. Likewise, it calculates the absolute value of the difference between the number $N_6$ of the parameters of the sixth block and each of the number $N_4$ of parameters of a fourth block to the number $N_1$ of parameters of a first block, and calculates the sum thereof as $S_6$.

For n=5, the sum of the absolute values of the differences each of which is taken between the number of parameters of the current block and the number of parameters of each of five blocks just before the :current block, is calculated.

For example, when all the numbers of parameters from the first block to the sixth block are equal to nine as shown in FIG. 6, the value of $S_6$ is equal to zero.

Subsequently, the processing goes to step S28, and the judgment circuit 11 judges whether Si is equal to a predetermined reference value $T_1$ or more. For example, if the reference value $T_1$ is set to 5, $S_6$ is smaller than the reference value $T_1$ because $S_6$ is equal to zero. Therefore, in this case, the processing goes to step S29 to judge whether the audio data terminate, or whether an instruction of finishing the search processing is made.

If the audio data have still existed or no instruction of the end of the search processing is made, the processing returns to step S25 to increment the variable i by "1", and in step S26 a new parameter Ni is obtained and stored. In step S27, the sum $S_7$ of the absolute values of the differences each of which is taken between the number of parameters of a current block (at present, $N_7$) and each of the numbers $N_2$ to $N_6$ of parameters of respective five blocks just before the current block is calculated. In step S28, it is judged again whether $S_7$ is equal to the reference value $T_1$ or more.

In the case of FIG. 6, the number $N_7$ of parameters of the seventh block is equal to 9, and thus $S_7$ is equal to zero. Therefore, the processing returns from step S29 to S25 to increment the variable n by "1", and in step S26 a parameter Ni is obtained and stored. In step S27, Si is calculated again. In this case, the number $N_8$ of parameters of an eighth block is equal to 10 as shown in FIG. 6, and each of the values of $N_3$ to $N_7$ is equal to 9, so that $S_8$=5.

Therefore, in step S28, $S_8$ is judged to be the reference value $T_1$ (=5) or more, and the processing goes to step S30. In step S30, it is judged whether the audio data terminate or whether the instruction of finishing the search processing is made. If it is judged that the audio data do not terminate or the instruction of finishing the search is not made, the processing goes to step S31 to increment the variable i by "1", and in this case i is set to 9. Subsequently, in step S32, the parameter $N_9$ is obtained and stored. In step S33, the sum $S_9$ of the absolute values of the differences each of which is taken between the number $N_9$ of parameters of the current block and each of the numbers $N_4$ to $N_8$ of parameters of five blocks just before the current block is calculated. As shown in FIG. 6, each of $N_4$ to $N_7$ is equal to 9, and $N_8$ is equal to 10, so that $S_9$ is equal to 4.

In step S34, it is judged whether Si is equal to a predetermined reference value $T_2$ or more. Assuming that the reference value $T_2$ is set to 4, the judgment of YES is made because $S_9$=4 in this case. The processing goes to step S35 to execute processing of setting the block just before the current block as an edition point. That is, in this case, the eighth block is set as the edition point (scene change point).

After the processing of step S35, or if Si is judged to be smaller than the reference value $T_2$ in step S34, the processing returns to step S29, and the subsequent steps are repeated.

In the case of FIG. 6, when $S_{10}$ is calculated in step S27, this value ($S_{10}$) is equal to 3, and thus the judgment "NO" is made in step S28.

As described above, when the number Ni: of parameters is equal to 9 for i=1 to 7 and continuously varies to 10 for i=8 and subsequent integers as shown in FIG. 6, the block of i=8 is detected as the edition point.

On the other hand, when the number $N_8$ of parameters is equal to 10 for only the eighth block and the number of parameters is equal to 9 for the blocks before and after the eighth block as shown in FIG. 7, $S_8$ is equal to 5 in step S28, so that it is judged to be the reference value $T_1$ (=5) or more in step S28. Therefore, the processing goes through the steps S30 to S32 to step S33 to calculate $S_9$. The value of $S_9$ is equal to 1. That is, since $S_9$ is smaller than the reference value $T_2$ (=4), the setting processing for the edition point in step S35 is not carried out, and the processing returns from step S29 to S25. As described above, when the number of parameters temporarily varies, it is not detected as a scene change (edition point).

When an edition point is detected by the judgment circuit 11, the detection result is supplied to the control circuit 12 as described above.

Figure 4:
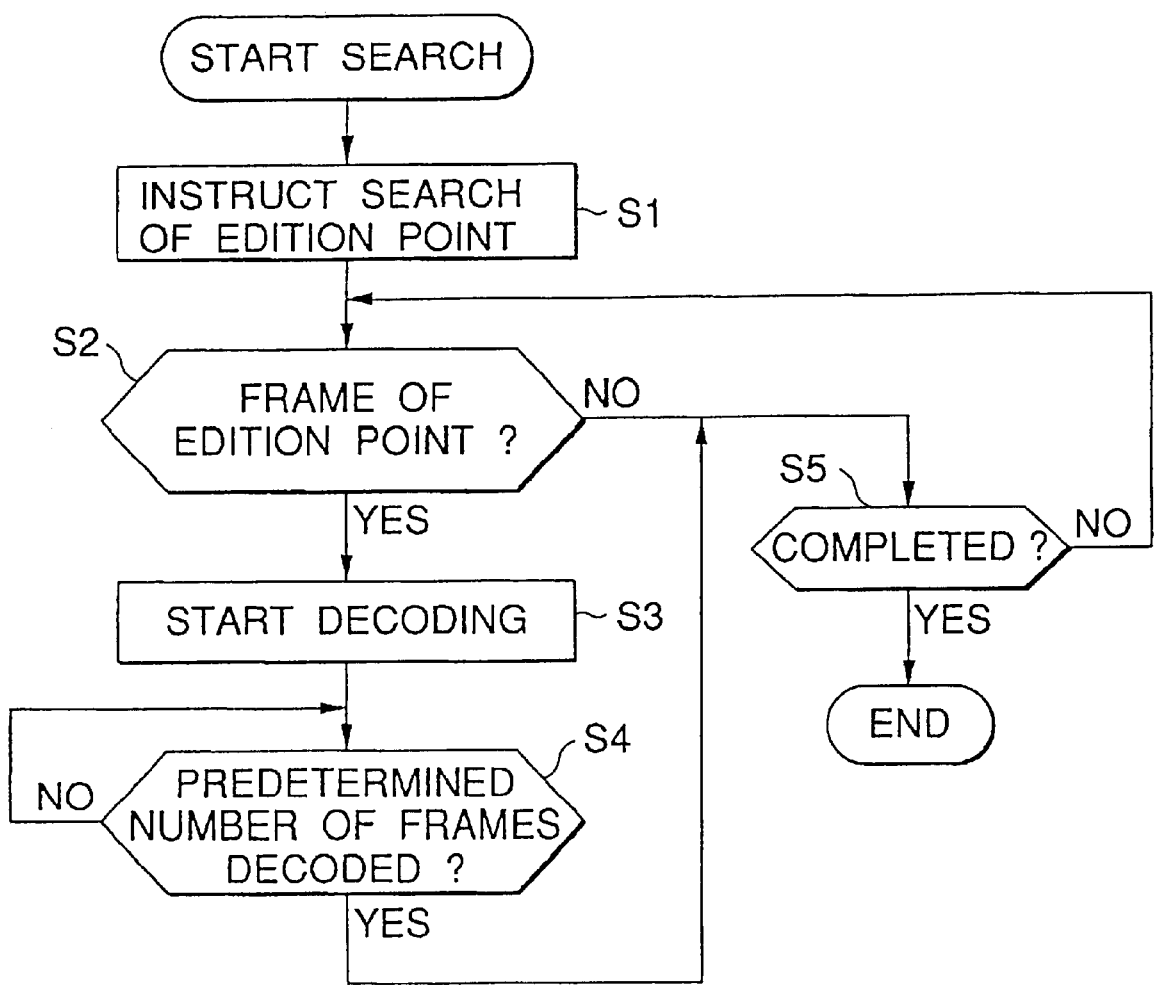
FIG. 4 is a flowchart showing the operation according to an embodiment of FIG. 1.

In step S2 of FIG. 4, the control circuit 12 judges whether a frame having an edition point is detected on the basis of the output of the judgment circuit 11. If no detection is made, the processing goes to step S5 to judge whether the end of the processing is instructed or not.

The control circuit 12 judges in the step S2 of FIG. 4 whether a frame having an edition point is detected on the basis of the output of the judgment circuit 11. If no frame having the edition point is detected, the processing goes to step S5 to judge whether the end of the processing is instructed. If no instruction is made, the processing returns to step S2 to judge whether a frame having an edition point is detected.

If it is judged in step S2 that the frame having the edition point is detected, the processing goes to step S3 in which the control circuit 12 controls the decoder 8 to start the decoding operation from the frame having the edition point. In step S4, the processing is on standby until a predetermined number of frames are decoded, and the processing returns from step S4 to step S5 when the predetermined number of frames are decoded.

When the edition point is detected as described above, the decoder 8 is supplied with the main information of the audio data and the parameters for decoding the main information from the buffer memory 7, and decodes these data according to the ATRAC system. The decoding result is supplied to the speaker 10 and output therefrom. The decoder 8 also decodes the corresponding video data according to the MPEG system, and outputs to the display 9 to display the video data.

Upon detection of the editing point as described above, an operation of outputting the audio signal corresponding to several seconds from the edition point thus detected and displaying the corresponding images is repeated.

Figure 8:
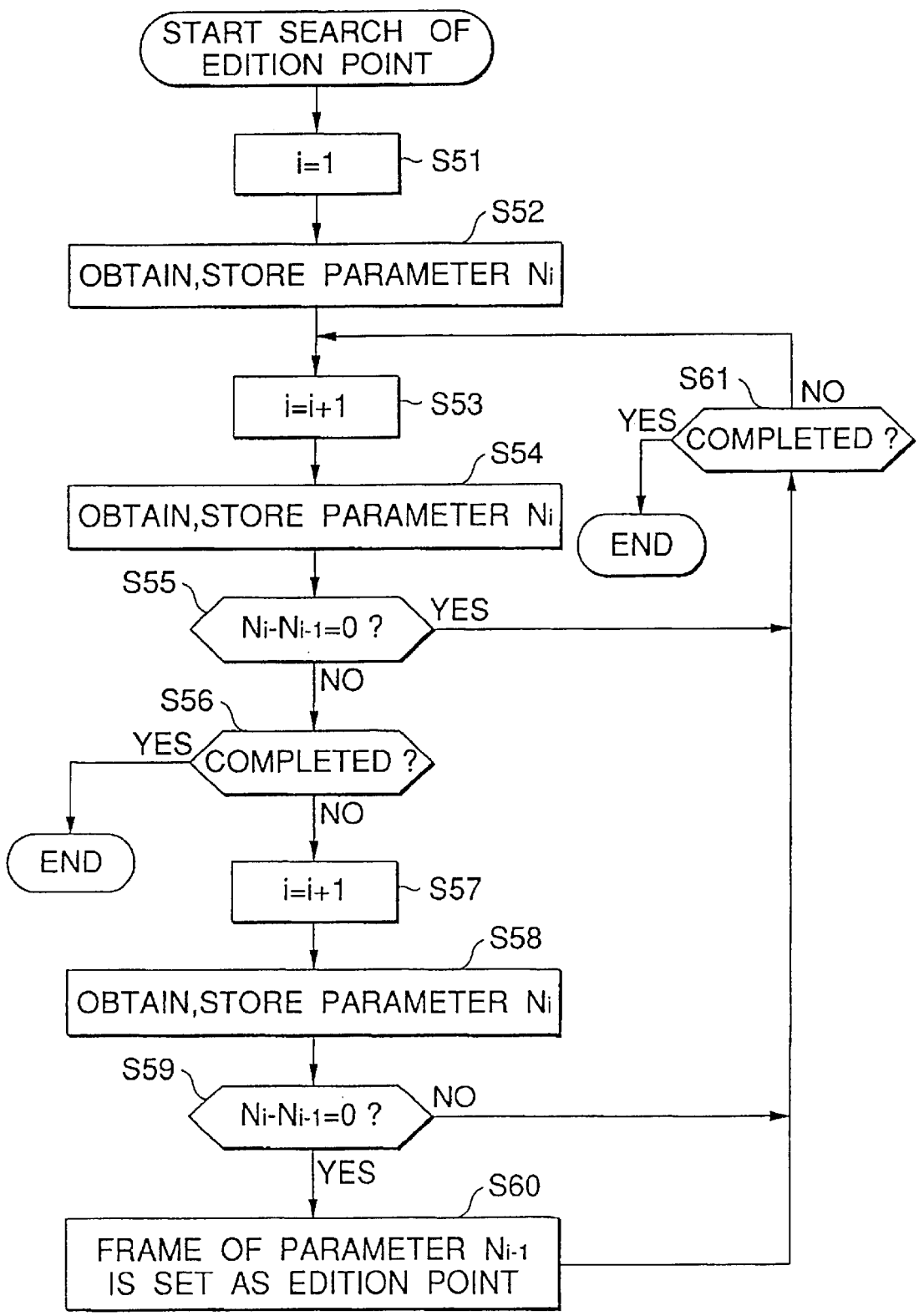
FIG. 8 is a flowchart showing another processing of the edition point searching processing of the judgment circuit 11 of FIG. 1.

FIG. 8 is a flowchart showing another processing of the edition point search processing.

In this processing, the variable i is initialized to "1" in step S51, and a parameter Ni is obtained and stored by the judgment circuit 11 in step S52. Subsequently, in step S53, the judgment circuit 11 increments the variable i by "1", and obtains and stores the parameter Ni corresponding to the incremented variable.:

In step S55, the judgment circuit 11 subtracts the parameter $N_{1-1}$ obtained and stored in step S52 from the parameter Ni obtained and stored in step S54, and judges whether the value is equal to zero. That is, it is judged whether the parameter number Ni of the current frame is equal to the parameter number $N_{i-1}$ of the frame just before the current frame. If both the parameter numbers are equal to each other, the processing goes to step S61 to judge whether the data terminates or whether the end of the search processing is instructed.

If the data have not yet terminated or the end of the processing is not instructed, the processing returns to step S53 to increment the variable i by "1", and in this case i is set to 3. In step S54, a parameter $N_3$ is obtained and stored. In step S55, it is judged whether the difference between the parameter $N_3$ of the current frame and the parameter $N_2$ of the just-before frame is equal to zero. If it is not equal to zero, the processing of steps S61, S53, S54, S55 is repeated carried out. In the case of FIG. 9, the number Ni of the parameters is equal to 9 for the first to fourth frames, and thus the above operation is repetitively carried out. Since $N_5=10$ for i=5, $N_5-N_4=1$. Therefore, in step S55 the "NO" judgment is made, and the processing goes to step S56. In step S56, it is judged whether the data terminate or the end of the search processing is instructed. If neither the data terminate, nor the end of the processing is instructed, the processing goes to step S57 to increment the variable i by "1". In this case, i is set to 6. In step S58, a parameter $N_6$ of i=6 is obtained and stored.

In step S59, the difference between the number of parameters of the current frame and the number of parameters of the just-before frame is calculated, and it is judged whether the difference therebetween is equal to zero. In the case of FIG. 9, $N_6=N_5=10$, so that the "YES" judgment is made in step S59, and the processing goes to step S60. In step S60, the processing of setting the frame just before the current frame as the edition point is carried out. That is, in the case of FIG. 9, the fifth frame is set as the edition point.

Subsequently to step S60, the processing returns to step S61. The same is satisfied when the "NO" judgment is made in step S59.

That is, as shown in FIG. 10, even when the parameter number $N_5$ of the fifth frame is equal to 10, the "NO" judgment is made in step S55 if the parameter number $N_6$ of the subsequent sixth frame is equal to 9, and the processing goes to step S59. In the judgment processing in step S59, since $N_6=9$ and $N_5=10$, the difference ($N_6-N_5$) is equal to −1, and thus the "NO" judgment is made in step S59. As a result, the setting processing as the edition point of the step S60 is not carried out.

In the above processing, the edition point is detected on the basis of the parameter number of each frame. However, the word length WL itself may be compared every frame, every frequency band (block) to detect the edition point.

Figure 11:
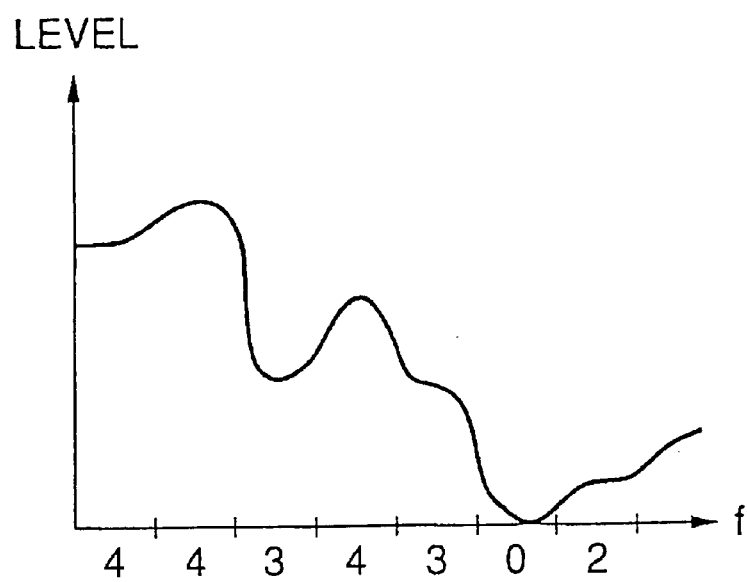
FIG. 11 is a diagram showing the properties of word length.
Figure 12:
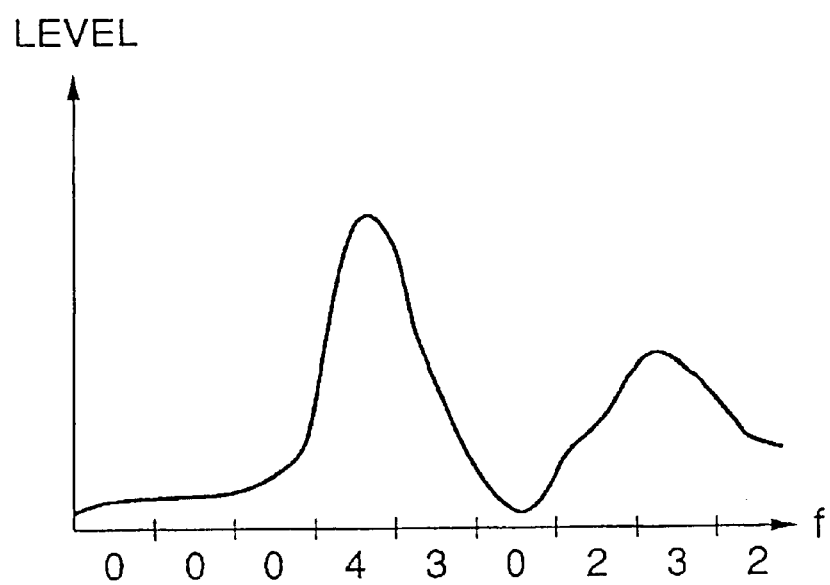
FIG. 12 is a diagram showing the properties of word length.

That is, for example when the word length WL is successively set to 4, 4, 3, 4, 3, 0, 2 from the low frequency band to the high frequency band as shown in FIG. 2, the level of the audio signal is expected to have a spectrum distribution which substantially corresponds to the word length as show in FIG. 11. Likewise, the frame of the audio signal having the word length shown in FIG. 3 is expected to have a spectrum distribution as shown in FIG. 12.

Figure 5:
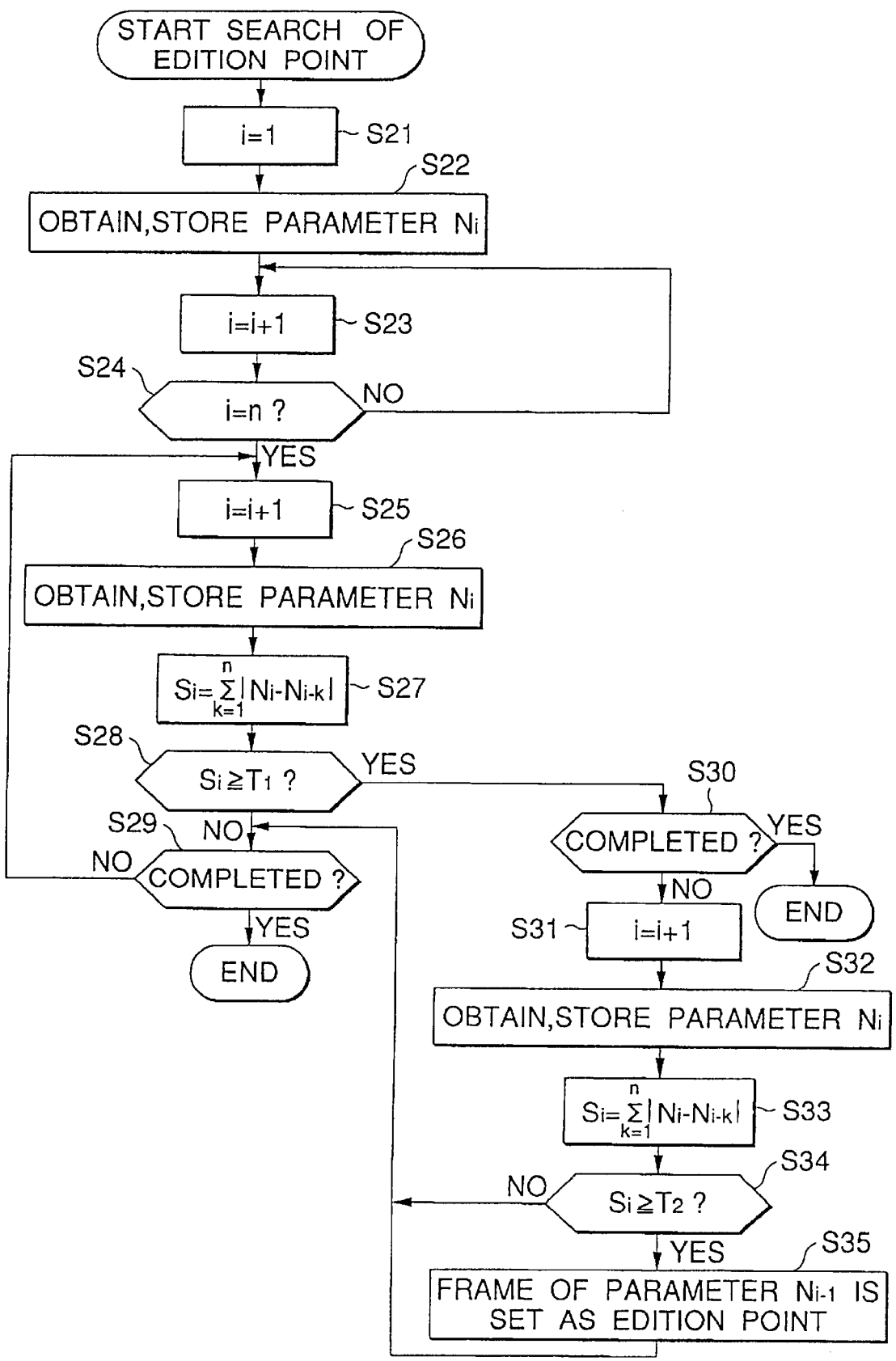
FIG. 5 is a flowchart showing edition point searching processing of a judgment circuit 11 of FIG. 1.

Therefore, the edition point can be detected by associating the parameter Ni in the processing of FIG. 5 or 8 with the word length WL. That is, in this case, the word lengths of the corresponding frequency bands (blocks) show in FIGS. 2 and 3 are subtracted from each other, and the absolute value of the difference therebetween is set as the absolute value of the difference of the parameters of each frame.

Figure 13:
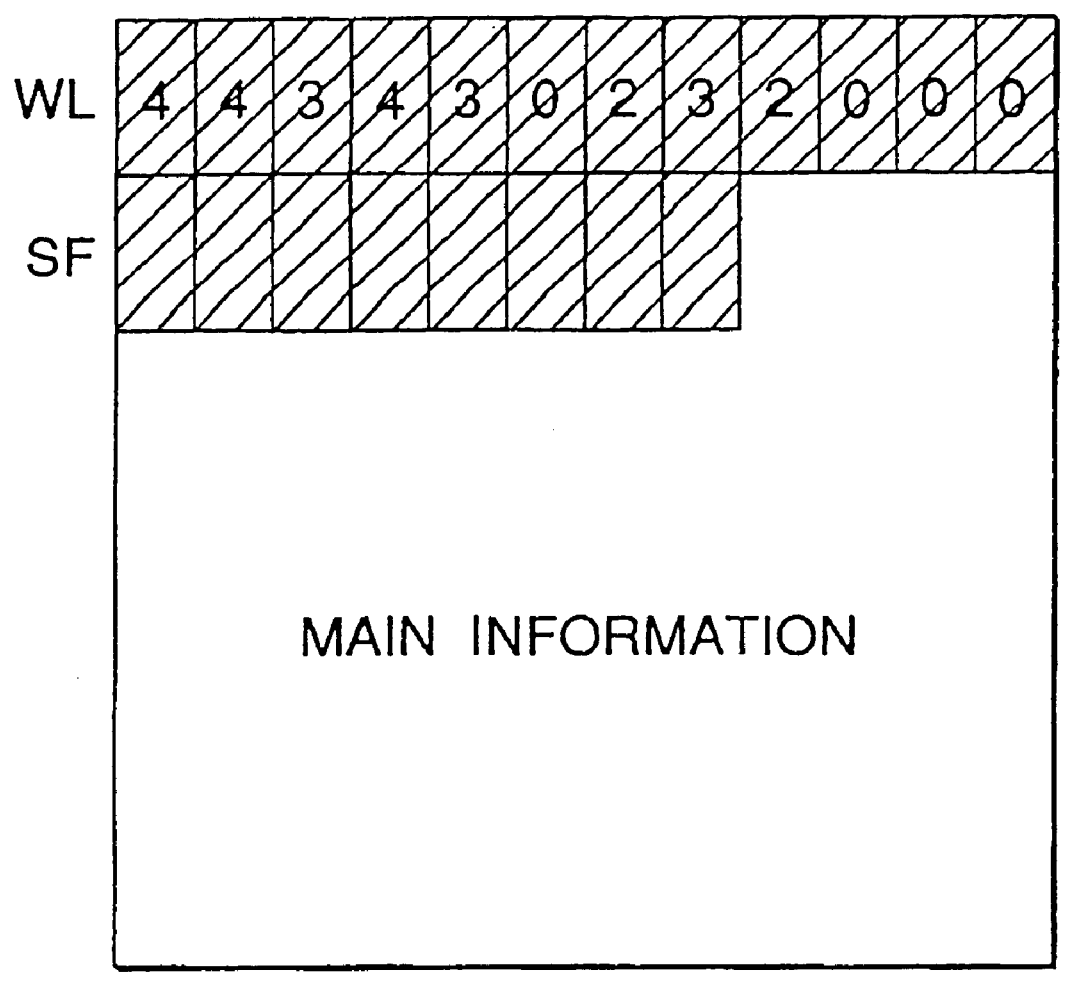

In this case, even when the parameter number of audio data is not recorded (transmitted) as shown in FIG. 13, the edition point can be detected.

When no corresponding frequency band exists as shown in FIGS. 2 and 3, the processing may be performed on the assumption that the parameters of the frequency band are equal to zero.

In the above embodiment, the edition point is detected on the basis of the parameters of the audio data, however, the edition point may be detected on the basis of the parameters of video data. For example, in MPEG-2 video, parameters of a picture layer shown in FIG. 14 are recorded. Intra_dc_precision (IDP) defines the quantizing precision of a coefficient of a DC component of an intra-pictures, and with 2 bits thereof, the quantizing precision can be varied in the range from 8 bits to 11 bits. It may be considered that the variation of the quantizing precision of the DC coefficient means a case where the properties of a pattern varies greatly, and this can be detected as an edition point (scene change).

Further, intra_vlc_format (IVF) is a parameter for defining selective use of two kinds of VLC tables of the DC coefficient of an intra-picture in accordance with the condition. Like the above case, it may be also considered that alteration of the table means a case where the properties of a pattern varies greatly, and this variation point can be detected as an edition point.

The processing of detecting these parameters can be performed as in the case of FIG. 5 or 8.

Further, in the above embodiment, the edition point is detected on the basis of the parameters of one of the audio data and the video data. However, the edition point may be detected by using the parameters of both the data. FIG. 15 shows a processing example in that case.

That is, in this processing, the control circuit 12 instructs the edition point search processing to each unit in step S71. At this time, the judgment circuit 11 detects an edition point on the basis of the parameters of audio data as described above, and also detect an edition point on the basis of the parameters of video data. The detection result is output to the control circuit 12.

The control circuit 12 judges in step S72 whether the edition point of the video signal is detected. If no edition point is detected, the processing goes to step S76 to judge whether the video signal terminates or the end of the search processing is instructed. If the video signal does not terminate or the end of the search of the video signal is not instructed, the processing goes to step S72 to judge whether the edition point of the video signal is detected.

As described above, if it is judged in step S72 that the edition point of the video signal is detected, the processing goes to step S73 in which the control circuit 12 further judges whether the edition point of the audio signal is detected. In the case where the video signal is detected, the processing goes to step S74 if the edition point is also detected from the corresponding audio signal, and the control circuit 12 controls the decoder 8 to start the decoding operation from the edition point thus detected. Thereafter, the processing goes to step S75 to be standby until a predetermined number of frames are decoded, and returns to step S76 when the predetermined number of frames are decoded.

Even when the edition point of the video signal is judged to be detected in step S72, the edition point is not finally detected as the true edition point in step S73 if the edition point is not detected from the audio signal corresponding to the video signal, whereby the edition point can be more accurately detected.

The check order of the detection processing of the edition points of the video signal and the audio signal in steps S72 and S73 may be inverted.

The present invention is not limited to the above embodiments, and may be applied to high-efficiency coding systems other than the ATRAC and MPEG. Further, the divisional unit of the signal is not limited to the frame. Various modification may be made without departing from the subject matter of the present invention.

Further, in addition to recording media such as a magnetic disc, CD-ROM, a solid memory, etc., other communication media such as a network, a satellite, etc. may be used as the transmission medium for transmitting to users the program for executing the above-described processing.

As described above, according to the information searching apparatus, the information searching method and the transmission medium of the present invention, the parameters associated with the coding are extracted, and the edition point is detected on the basis of the parameters. Therefore, the edition point can be detected without decoding all the coded data, and the searching operation can be performed simply and accurately without using any special-purpose processor for performing decoding processing at a high speed.

What is claimed is:

1. An information searching apparatus comprising:
   extraction means for extracting a parameter associated with coding from data which are obtained by coding predetermined information every predetermined unit;
   comparison means for comparing the parameter of a prescribed unit with the parameter of another unit; and
   detection means for detecting an edition point of information in accordance with a comparison result of said comparing means;
   wherein the information is a compressed audio signal, and the parameter is a scale factor or word length.

2. An information searching apparatus comprising:
   extraction means for extracting a parameter associated with coding from data which are obtained by coding predetermined information every predetermined unit;
   comparison means for comparing the parameter of a prescribed unit with the parameter of another unit; and
   detection means for detecting an edition point of information in accordance with a comparison result of said comparing means;
   wherein the information is an MPEG video signal, and the parameter is intra_dc_precision or intra_vlc_format.

3. An information searching method comprising the steps of:
   extracting a parameter associated with coding from data which are obtained by coding predetermined information every predetermined unit;
   comparing a parameter of a predetermined unit with a parameter of another unit; and
   detecting an edition point of information in accordance with a comparison result of said comparing step;
   wherein the information is a compressed audio signal, and the parameter is a scale factor or word length.

4. An information searching method comprising the steps of:
   extracting a parameter associated with coding from data which are obtained by coding predetermined information every predetermined unit;
   comparing a parameter of a predetermined unit with a parameter of another unit; and
   detecting an edition point of information in accordance with a comparison result of said comparing step;
   wherein the information is an MPEG video signal, and the parameter is intra_dc_precision or intra_vlc_format.

5. An information searching method comprising the steps of:
   extracting a parameter associated with coding from data which are obtained by coding predetermined information every predetermined unit;
   comparing a parameter of a predetermined unit with a parameter of another unit; and
   detecting an edition point of information in accordance with a comparison result of said comparing step;
   wherein the information contains a video signal and an audio signal, and wherein said comparing step compares the parameter of the video signal of the prescribed unit with the parameter of the video signal of said another unit and also compares the parameter of the audio signal of the prescribed unit with the parameter of the audio signal of said another unit, and said detection step detects the edition point on the basis of both the comparison result of the parameter of the video signal and the comparison result of the parameter of the audio signal.

6. A transmission medium for transmitting a program comprising:
   extracting a parameter associated with coding from data which are obtained by coding predetermined information every predetermined unit;
   comparing a parameter of a predetermined unit with a parameter of another unit; and
   detecting an edition point of information in accordance with a comparison result of said comparing step;
   wherein said parameter is selected from the group consisting of a scale factor or word length of a compressed audio signal, and intra_dc_precision or intra_vlc_format of an MPEG compressed video signal.

7. The transmission medium of claim 6, wherein said transmission medium is selected from the group consisting of a recording medium and a communication medium.

8. Apparatus for detecting an edition point in an audio/video data stream, comprising:
   extraction means for extracting a number of parameters associated with coding from data which are obtained by coding predetermined information every predetermined unit;
   comparison means for comparing the number of parameters of a prescribed unit with the number of parameters of at least one other unit and determining if the number has changed; and
   detection means for detecting an edition point in said data stream in accordance with the determination by said comparing means.

9. Apparatus according to claim 8 wherein said comparison means compares the number of parameters of a prescribed unit with the number of parameters of each of a predetermined plurality of previous units.

10. Apparatus according to claim 9, wherein said edition point is detected for said prescribed unit if the number of parameters for that unit as compared to the plurality of previous units has changed and it is determined that the change is non-temporary.

11. Apparatus according to claim 8 wherein said data stream contains a compressed audio signal, and the parameters are scale factors or word lengths.

12. Apparatus according to claim 8 wherein the data stream contains an MPEG video signal, and the parameters are intra_dc_precision or intra_vlc_format parameters.

13. Apparatus according to claim 8 wherein each unit is a frame.

14. Method for detecting an edition point in an audio/video data stream, comprising the steps of:
   extracting a number of parameters associated with coding from data which are obtained by coding predetermined information every predetermined unit;
   comparing the number of parameters of a prescribed unit with the number of parameters of at least one other unit and determining if the number has changed; and
   detecting an edition point in said data stream in accordance with the determination in said comparing step.

15. Method according to claim 14 wherein the number of parameters of a prescribed unit is compared with the number of parameters of each of a predetermined plurality of previous units in said comparing step.

16. Method according to claim 15, wherein said edition point is detected for said prescribed unit if the number of parameters for that unit as compared to the plurality of previous units has changed and it is determined that the change is non-temporary.

17. Method according to claim 14 wherein said data stream contains a compressed audio signal, and the parameters are scale factors or word lengths.

18. Method according to claim 14 wherein the data stream contains an MPEG video signal, and the parameters are intra_dc_precision or intra_vlc_format parameters.

* * * * *